Dec. 16, 1952   J. W. PUTT ET AL   2,622,062
APPARATUS FOR AUTOMATIC COLLECTION OF LIQUID FRACTIONS
Filed June 8, 1949   2 SHEETS—SHEET 1

INVENTORS.
John O. McLean
John O. Smith Jr.
John W. Putt
BY Mitchell & Cordos
ATTORNEY.

Dec. 16, 1952     J. W. PUTT ET AL     2,622,062
APPARATUS FOR AUTOMATIC COLLECTION OF LIQUID FRACTIONS
Filed June 8, 1949     2 SHEETS—SHEET 2
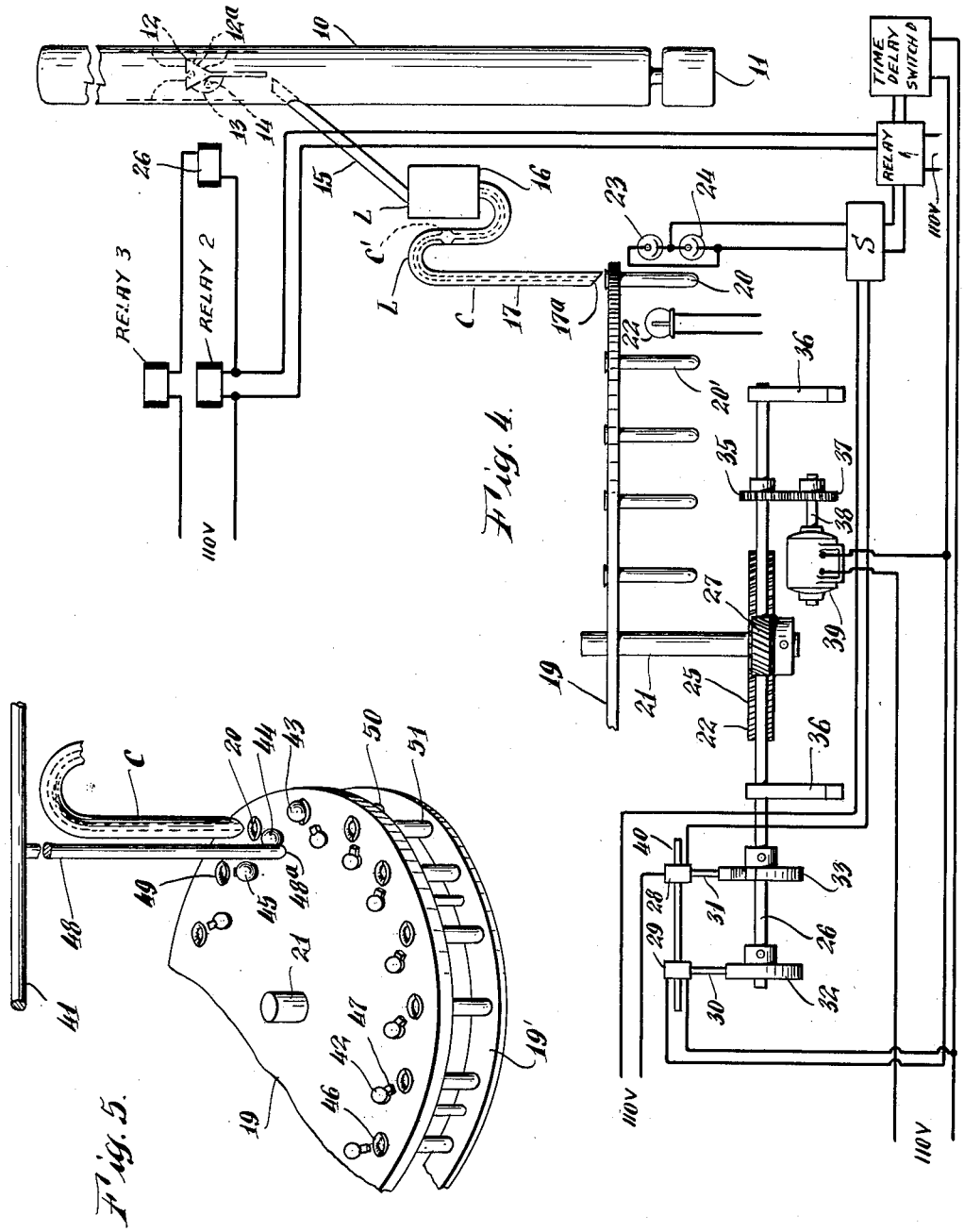
INVENTORS.
John O. McLean
John O. Smith Jr.
John W. Putt
BY Mitchell G. Cardos
ATTORNEY.

Patented Dec. 16, 1952

2,622,062

UNITED STATES PATENT OFFICE 2,622,062

APPARATUS FOR AUTOMATIC COLLECTION OF LIQUID FRACTIONS

John W. Putt, Jersey City, and John O. Smith, Jr., and John O. McLean, North Plainfield, N. J., assignors to Tide Water Associated Oil Company, Bayonne, N. J., a corporation of Delaware Application June 8, 1949, Serial No. 97,902

11 Claims. (Cl. 202—158)

The present invention relates to an apparatus adaptable for collecting a plurality of liquid samples or fractions and, in particular, to an improved apparatus adapted for collecting such samples or fractions in a fully automatic manner. In a specific embodiment, the invention relates to an improved apparatus suitable for fractionation and collection of a plurality of fractions of predetermined volume from a distillable liquid or mixtures of distillable liquids whereby the complete cycle beginning with the fractionation through collection of the fractions is carried out in a fully automatic manner.

In the handling and investigation of liquids in commercial and/or laboratory operations, it is often desired to obtain from such liquids a plurality of fractions of predetermined volume. For example, in operations employing vessels, conduits, liquid supply lines, etc., that contain or through which liquids flow, it is often desired to obtain a plurality of successive samples or fractions of predetermined volume for purposes of analysis, quality control, etc. Similarly, it is often desired to obtain, from liquids undergoing reaction, a series of samples of predetermined volume for analysis of the reactant mixture for determining reaction rates, for exercising control thereof, etc. In still another example, it is often desired to separate liquids into components thereof or into more simple mixtures by fractional distillation into a plurality of fractions of equal predetermined volume. For such a purpose, it is common practice to effect the fractionation in stills provided with an adequate distilling column which may contain packing, bubble plates or other suitable contact means. The vapors from the still top are usually condensed and a portion thereof returned to the column to provide reflux while a second portion is withdrawn as distillate or product. Insofar as we are aware, apparatus heretofore disclosed for obtaining a plurality of successive fractions of predetermined volume (such as in the fractionation of distillable liquids) though automatic in character, have certain deficiencies, such for example, as those arising from improper or inefficient correlation of important elements including distillate measuring and collection means. There is, therefore, a need in the art for an improved fully automatic apparatus which will overcome these deficiencies. Such an apparatus is provided by the present invention as is apparent from the description thereof set forth hereinafter.

Broadly, the apparatus of this invention comprises, in combination, a liquid-containing means, a liquid measuring means, and a liquid collection means, all correlated and operated automatically in improved manner. One important feature of the invention comprises the provision of improved apparatus of the type described containing, in combination, means for automatically correlating a means for collecting successive samples or fractions of a liquid with means for measuring and discharging liquid into successive receptacles to insure proper residence time of each successive receptacle at a receiving station, means for replacing a receptacle containing a measured amount of liquid with an empty receptacle at the receiving station, and means for actuating the last-named means including time delay mechanism actuated by the level of liquid in the receptacle permitting all of the predetermined or measured amount of liquid to be discharged into a receptacle before replacement thereof with an empty receptacle for receipt of a subsequent fraction of predetermined volume. In a specific embodiment, the apparatus of this invention comprises, in combination, a liquid-containing means which may be in the form of a distillation column, a reflux line, a liquid transfer line, etc., a discharge means automatically actuable to either discharge or prevent liquid from discharging from said liquid containing means, a measuring means adapted to receive liquid discharged from said liquid-containing means, said measuring means being adapted to collect and discharge a predetermined volume of liquid, a receiving means including a plurality of light transmittable receptacles, each receptacle being capable of holding a measured volume of liquid to be discharged by said measuring means, said receiving means being actuable to bring a receptacle in position to receive liquid from said measuring means and to replace said receptacle, after receipt of liquid thereby, with an empty receptacle for receipt of a subsequent liquid discharge of predetermined volume as before, and means actuable by the liquid reaching a predetermined level in the receptacle being filled to prevent entry of liquid into said measuring means while said measuring means is completing its discharge of liquid into the receptacle and to actuate said receiving means, after time delay sufficient to permit complete discharge of liquid from said measuring means, to bring an empty receptacle in proper registry for receipt of a subsequent liquid discharge from said measuring means.

Although, as aforesaid, the apparatus embodied herein may be adaptable for use in collection of liquid samples and fractions from a suitable liquid-containing means, as for example, conduits, reflux lines, vessels, etc. it is especially useful in the distillation of liquids and collection therefrom of a plurality of liquid fractions of predetermined volume. Hence, for purposes of illustration, but not limitation, the invention is described hereinafter with reference to its use in the collection of such liquid fractions in the fractionation of a liquid by distillation.

In order that the invention may be more fully understood, reference is made to the attached drawings showing a preferred, but not limitative, embodiment of an apparatus as embodied herein. In the drawings, Figure 1 illustrates, in diagrammatic form, mechanical and electrical apparatus embodying certain features of the invention with respect to a suitable arrangement thereof with a distillation column;

Figure 4 is an illustration in diagrammatic form, of an apparatus showing in suitable assembly the illustrations of Figures 1 and 2 in arrangement with a circuit as shown in Figure 3, and Figure 5 is an illustration in perspective of a means suitable for use in sealing of the receptacles subsequent to filling thereof with liquid.

Figure 1:
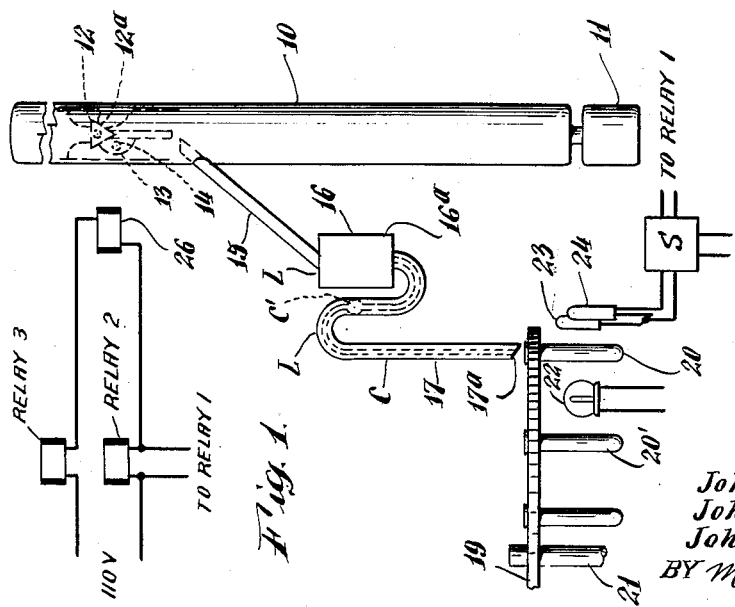

Referring to Figure 1, numeral 10 represents a distillation column which preferably contains suitable contact material (not shown) which may be in the form of packing, bubble plates, or any conventional material known to those in the art for use in fractional distillation of liquids, and numeral 11 represents a still pot for the liquid to be fractionated. Though not shown, any desired means may be employed for heating of the liquid in the still pot, many of which are known to those skilled in the art, for automatically controlling the heat input to the liquid in the still pot to provide a constant boiling rate over an extended period of time. For purposes of illustration, however, a means suitable for controlling the boiling rate may comprise a suitable manostat, actuable by the pressure in the still pot, which actuates a heat source for controlling the heat input to the liquid in the still pot depending upon the pressure in the still pot. As aforesaid, the liquid containing means, which in Figure 1 is illustrated by distillation column 10, includes, in preferred embodiment, a reflux control means actuable as desired to either discharge or prevent discharge of liquid, e. g., condensation, from the still. Although it is not intended that the apparatus of this invention be limited thereto, a suitable liquid discharge control means has been illustrated in Figure 1. Such a means comprises a funnel 12 suitably supported in the head of column 10 and pivotable, as shown by pivot 12a, and adaptable either to be brought into registry with a take off line, as shown by line 15, for withdrawal of condensate from the column or to remain in the position shown by Figure 1 to return condensate to the column as reflux. The pivotable funnel 12 may be actuated in the desired manner, but in preferred embodiment, funnel 12 has attached thereto a soft iron core 14 which may be covered with a corrosion-resistant material, e. g., glass, as shown by numeral 13, which when placed in a changing magnetic field such as established by energizing electromagnet 26 will bring funnel 12 in registry with take off line 15. When electromagnet 26 is deenergized and the electromagnetic field destroyed, funnel 12 falls back into at-rest position, thus preventing discharge of condensate into take off line 15 and returning of the condensate to the column 10 as reflux. In such a means, the current source circuit to the electromagnet 26 suitably includes a relay 3 which controls the reflux ratio in the still by periodic and in-order energizing and deenergizing of the electromagnet. That current source circuit also suitably contains a relay 2, as shown. When such a relay, e. g., relay 2, is closed, relay 3 controls the energizing and deenergizing of the electromagnet, but when relay 2 is open, the circuit to the electromagnet is broken whereby the electromagnet is denergized. In the embodiment shown, the apparatus includes, in communication with take off line 15, a measuring means adapted to receive the liquid discharged therein through take-off line 15, and to discharge upon entry of a predetermined volume of liquid into the measuring means. Such a measuring means may be in the form of a siphon pipette 16 comprising a measuring cell 16a and a siphon 17 arranged so that when a predetermined volume of liquid has entered the measuring cell 16a, as at liquid level L, the measured amount of liquid in cell 16a will discharge by siphoning action through siphon 17. Preferably, siphon 17 includes a capillary C having an enlarged portion as shown by C', the purpose of enlarged portion C' being to allow any air that may be trapped in cell 16a to escape without forcing cell 16a to discharge before the measured volume of distillate has collected therein. The apparatus also includes a receiving means for collection of successive fractions of liquid to be discharged by measuring means 16. In illustration thereof, a suitable receiving means may be in the form of a turntable, as shown by turntable 19, actuated by rotation of a shaft such as shaft 21. The turntable 19 includes a plurality of transparent receptacles, e. g., glass receptacles, as shown by numerals 20 and 20', each receptacle being capable of holding a measured volume of distillate discharge by measuring cell 16a. In preferred embodiment, the receptacles 20 are mounted on the turntable 19 in equally spaced arrangement around a circumferential portion of the turntable 19 whereupon, by rotating of the turntable, the receptacles are brought into registry with discharge portion 17a of capillary C. A light source, as for example, projection lamp 22, is positioned on one side of a receptacle 20 which is in registry with discharge portion 17a of capillary C, and a light responsive means as for example, a photocell or, preferably, a plurality of photocells, as shown by photocells 23 and 24, are positioned on the opposite side of the receptacle 20 which is in registry with discharge portion 17a of capillary C. The light source and the light responsive means are positioned in a manner so that when the diffused light from light source 22 falling on the light responsive means is not interrupted by liquid in the receptacle 20, the light responsive means is not energized. The arrangement of light source 22 and the photocells is such, however, that when the diffused light from light source 22 is interrupted by a predetermined level of liquid in the receptacle, the liquid acts as a crude lens to focus and thereby concentrate the light on the light responsive means which when so energized actuates an automatic reset relay S to which it is electrically connected as shown. In preferred embodiment, a plurality of photocells is employed as the light responsive means as shown by photocells 23 and 24, as use of a plurality of photocells results in improved operation of the apparatus as compared to use of a single light responsive means, i. e., a single photocell. In using two photocells as shown in Figure 1, the photocells are connected to oppose each other so that when the illumination on both cells is equal, the resulting current flow is zero, but when the illumination on one photocell is increased, that photocell produces more current than the balancing cell and actuates automatic reset relay S. In the embodiment shown in Figure 1, light source 22 and photocells 23 and 24 are arranged so that the photocells are in balance when the diffused light from light source 22 passes through receptacle 20 before the liquid discharged therein has reached a level sufficient to interrupt light from light source 22. When, however, the liquid level in receptacle 20 has reached a predetermined level, correlated with the predetermined arrangement of light source 22 and the photocells, the diffused light from light source 22 is focused by the liquid which functions as a crude lens thereby increasing the light concentration on one of the photocells, thus unbalancing the photocell circuit resulting in actuation of automatic reset relay S. One important feature resulting from the use of such a plurality of photocells in an apparatus of the type described is that the apparatus is adaptable for continuous operation in a highly efficient and accurate manner irrespective of variations in light intensity as may be caused by current fluctuations in the light source circuit and/or variations in extraneous light.

Figure 2:
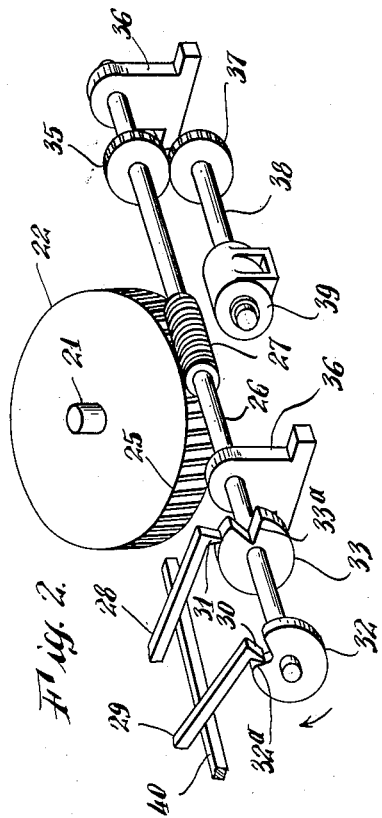
Figure 2 illustrates, partly in perspective and partly diagrammatic, an arrangement of mechanical and electrical apparatus suitable for actuating a receiving means for collection of desired fractions, in accordance with the invention.

In Figure 2 there is shown an arrangement of mechanical and electrical apparatus suitable for actuating a receiving means, such as described with reference to Figure 1, for replacing a receptacle, after it has received a predetermined amount of liquid discharge from measuring means 16, with an empty receptacle at the filling position for receipt of the next liquid discharge from measuring cell 16. In the arrangement shown, shaft 21, which actuates turntable 19 (Figure 1) is actuated by gear 22 geared as shown by geared portion 25, which meshes with worm gear 27 on shaft 26, shaft 26 being supported by suitable means, as for example by journal blocks 36. Shaft 26 may suitably be actuated by gear 35 rigidly mounted thereon through engagement with gear 37 operated by shaft 38 of motor 39. Suitable switch actuating means, such as cams 32 and 33 are mounted on shaft 26, the purpose of the cams being to operate a set of switches, e. g., mercury switches 28 and 29, mounted on a suitable support 40, through cam followers 31 and 30, respectively, positioned to follow the profiles of the cams and to make or break contact of the switches depending upon the position of the cam followers on the cam profiles. Depending on the spacing of the receptacles on the turntable 19, which spacing determines the degree of desired rotation of the turntable for replacing a filled receptacle at the filling position with an adjacent empty receptacle, the gear ratio of gear 25 to worm gear 27 is such that upon one complete revolution of shaft 26, turntable 19 will rotate the exact distance required to replace a filled receptacle in registry with capillary C with an empty receptacle positioned adjacent to the filled receptacle on the turntable e. g., in the illustration of Figure 1, to replace receptacle 20 with receptacle 20'. Cams 32 and 33 are mounted on shaft 26 in a suitable manner for controlling the closing and opening of switches 29 and 28 through cam followers 30 and 31, respectively, due to the positioning thereof on the profiles of cams 32 and 33, respectively. Cam 32 is profiled in a manner so that switch 29 is open upon the start of rotation of the shaft, but to close switch 29 shortly after the start of rotation of shaft 26, and to maintain that switch closed for one complete revolution of shaft 26, the closing of switch 29 being effected through cam follower 30 during following thereof on the profile of the recession 32a in cam 32. Cam 33 is profiled in a manner whereby switch 28 is also open upon the start of rotation of shaft 26, but to close switch 28 after the start of rotation of shaft 26 and closing of switch 29, and to break contact of switch 28 before shaft 26 has made one complete revolution. That is, switch 28 is kept in contact by cam 33 for only a fraction of the time required for one complete revolution of shaft 26. The desired closing and opening of the switches 28 and 29 with respect to each other may suitably be effected by staggering of the recessions 32a and 33a in cams 32 and 33, respectively, in the manner shown, wherein switch 28 is closed during following of cam follower 31 of the recession 33a in cam 33 and wherein switch 29 is open during the following of cam follower 30 of recession 32a in cam 32. The purpose of such an arrangement, as is described more fully hereinafter in describing Figure 4, is for switch 29, connected in a circuit as shown hereinafter in Figure 3, to keep motor 39 in operation for a time sufficient to effect one complete rotation of shaft 26 which, as aforediscussed, results in turning the turntable 19 the exact distance required for replacing a filled receptacle at the filling station with an empty receptacle; and for switch 28 to make contact for a period of time less than sufficient for shaft 26 to make one complete revolution whereby switch 28, connected in a circuit shown in Figure 3, makes contact and allows automatic reset relay S to reset itself prior to the completion of a complete revolution of shaft 26. Hence, by use of a correlated gear ratio between gear 25 and worm gear 27, correlation thereof with cams 32 and 33 for controlling the making and breaking of contact of switches 29 and 28 during rotation of shaft 26, proper control over the turntable is maintained in a continuous and accurate manner for positioning of an empty receptacle in registry with discharge portion 11a of capillary C followed by desired replacement of such a receptacle (when filled) with another empty receptacle.

Figure 3:
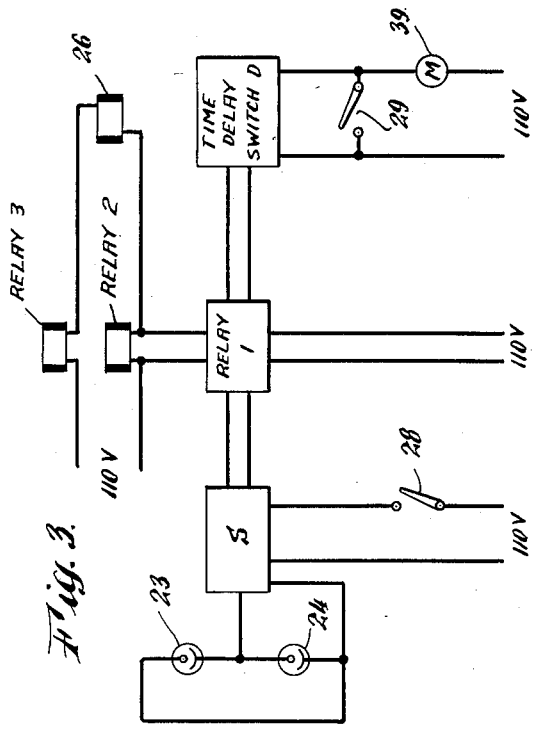
Figure 3 is a schematic drawing illustrating an electrical circuit suitable for use in practicing the invention.

Figure 3 shows a schematic drawing of a circuit suitable for use in an apparatus such as embodied herein. Briefly, such a circuit comprises a light responsive means which preferably consists of two photocells, cells 23 and 24, connected to oppose each other as above described. Photocells 23 and 24 are connected to an automatic reset relay S. The automatic reset relay S, a suitable example of which is a "Weston Sensitrol," is connected in the manner shown to a relay, as shown by relay 1, and through switch 28 to a current source. The action of switch 28 on automatic reset relay S has been described hereinbefore. Relay 1 is connected to another relay, illustrated by relay 2 in the circuit to electromagnet 26, to a current source, and to a time delay switch D in the manner shown. The time delay switch D is connected through motor 39 to a current source and as shown, switch 29 is connected in the motor circuit. Time delay switch D contains time delay mechanism which, after being started by current from relay 1, will close the motor circuit to motor 39 a predetermined time after said mechanism is started, and subsequently will open the motor circuit and reset itself for another cycle.

In Figure 4 there is shown an apparatus in complete assembly including the use of a circuit as shown in Figure 3 and, hence, the operation of such a circuit as shown is described in more detail in the following description of Figure 4.

Referring to Figure 4, and for purpose of illustrating a specific embodiment of the invention, turntable 19 contains a plurality of glass tubes of the same shape and size, shown by numeral 20, 20', etc. mounted in a circumferential portion of the turntable in a manner whereby, upon rotating of the turntable, the receptacles are brought into registry with discharge portion 17a of capillary C. For purposes of this illustration, turntable 19 contains 80 glass tubes mounted thereon in equally spaced holes in a circumferential portion of the turntable. Thus, in order to replace a receptacle, in registry with a discharge portion 17a of capillary C, with an empty adjacent receptacle, a rotation of 1/80 of a complete revolution of the turntable is required. As aforesaid, turntable 19 is actuated by shaft 21 through gear 25 being actuated by worm gear 27 on shaft 26, the gear ratio of gear 25 to gear 27 being such as to turn the turntable 1/80 of a revolution upon one complete revolution of shaft 26. Cams 32 and 33, mounted on shaft 26, are profiled in a manner described hereinbefore whereby, after initiation of rotation of shaft 26, cams 32 and 33 (through cam followers 30 and 31, respectively) complete contact of switches 29 and 28. The profiling of cam 32 is such as to keep switch 29 in contact for one complete revolution of shaft 26, and the profiling of cam 33 is such as to maintain switch 28 in contact for a period of time less than one complete revolution of shaft 26. With an arrangement as set forth in Figure 4, a liquid to be distilled is placed in still pot 11 and by controlled heating thereof by suitable means to provide a constant boiling rate, the column is brought to equilibrium. Current is then turned on in the circuit to electromagnet 26 and the electromagnet is periodically energized and deenergized by relay 3 to control reflux ratio in the column bringing funnel 12 in registry with take off line 15 whereby condensate from the column discharges into measuring cell 16 when the electromagnet is energized. When a measured volume of condensate, as shown at liquid level L, has collected in measuring cell 16, the condensate discharges from cell 16 by siphoning through capillary C and into receptacle 20 which is in registry with discharge portion 17a of capillary C. Light source 22, e. g., a projection lamp, and photocells 23 and 24 are so arranged whereby, when the condensate in receptacle 20 reaches a predetermined level sufficient to interrupt the diffused light from light source 22, the liquid in receptacle 20 focuses the light by crude lens action to concentrate the light on one of the photocells whereby photocells 23 and 24 are unbalanced. One important feature of this invention is that light source 22 and the light responsive means, such as photocells 23 and 24 may be positioned so that the diffused light from the light source will be interrupted after some liquid, but before a complete discharge of measuring cell 16, has drained into receptacle 20, thus effecting actuation of the photocells before complete drainage of measuring cell 16 has occurred into a particular receptacle. Although the positioning of the light source and the photocells may be varied to suit particular requirements, and adaptable for collecting a single cell discharge or a plurality of cell discharges into a single receptacle, suitable arrangements include positioning of the light source and the photocells whereby actuation of the photocells occurs upon entry of a substantial amount of the liquid to be discharged by cell 16 into the receptacle in registry with the measuring cell. Hence, in some instances, the positioning of the light source and the cells may be such as to actuate the cells by entry into the receptacle of one-half of the total amount of liquid to be discharged by the measuring cell, in other instances, when three quarters of the total amount to be discharged by measuring cell 16 has entered the receptacle, and in still other instances, when more than three quarters of the measured amount of liquid from measuring cell 16 has discharged into the receptacle, but the preferred arrangement is such as to actuate the photocells when substantially all of the measured volume in the measuring cell has discharged into the receptacle and, hence, requiring an arbitrary setting of the time delay for only a short period of time to allow drainage to occur from the measuring cell. Thus, depending upon the arrangement of the photocells with respect to the light source, and particularly in operations wherein the fractions to be collected are substantially non-volatile, the apparatus may be arranged to collect any integral number of discharges from the measuring cell into a single receptacle. When the photocells 23 and 24 are unbalanced by focusing of the light due to the liquid having reached a predetermined level in the receiving receptacle, the resulting current flow through the photocells actuates the automatic reset relay S. Such actuation of the automatic reset relay S results in (1) starting of the time delay mechanism in time delay switch D through relay 1 and (2) breaking, through relay 2, the circuit to electromagnet 26 whereby funnel 12 is brought to at-rest position, thus stopping discharge of condensate into measuring cell 16. After a predetermined time interval to which the time delay mechanism of time delay switch D has been set, such time delay being predetermined so as to be sufficient to allow the measuring cell 16 to complete discharge and/or drainage of the measured volume of liquid therein into receptacle 20, time delay switch D turns on motor 39 which starts the turntable 19 turning through actuation by motor 39 of the gear arrangement shown and aforediscussed with reference to Figure 2. After initiation of rotation of the turntable through turning of shaft 26, cams 32 and 33 also start to rotate and cam 32 closes switch 29. Shortly after closing of switch 29, and before shaft 26 has completed one revolution, cam follower 31, due to positioning thereof on cam 33 temporarily closes switch 28 which enables automatic reset relay S to reset itself and be prepared for subsequent actuation by the photocells in the next cycle. Closing of switch 28 also results in opening relay 1, closing of relay 2 and opening of time delay switch D. Closing of relay 2 allows relay 3 to control the periodic energizing and deenergizing of electromagnet 26 for reflux control. Thus, when relay 2 is closed and relay 3 is in the energizing cycle, funnel 12 is brought into registry with take off line 15 and discharges condensate into measuring means 16. Opening of time delay switch D normally would break the motor circuit and stop the turntable from rotating; however, since switch 29 is still closed, motor 39 continues to operate until switch 29 is opened by cam 32, the opening of switch 29, by cam 32 occurring at the completion of one complete revolution of shaft 26 whereby the turntable has rotated the exact distance required to replace the receptacle which has received the total measured amount of liquid from measuring cell 16 with an adjacent empty receptacle for receipt of a subsequent discharge from the measuring cell 16 which is collecting liquid during the rotation of the turntable. When measuring cell 16 has again collected the measured amount of condensate, discharge therefrom occurs into receptacle 20' (which has now replaced filled receptacle 20) and the liquid entering receptacle 20', upon reaching the predetermined level for focusing and concentrating of the light by the liquid, again unbalances the photocells to begin a new cycle in the manner aforedescribed.

In the use of apparatus such as embodied herein, and wherein the fractions to be collected are volatile, it is desirable to seal the receptacles after liquid has been discharged therein to prevent loss by evaporation. Such sealing is, for example, highly desirable in the collection of fractions from light hydrocarbon mixtures such as those in the boiling range of gasoline. For such applications, the apparatus of this invention desirably includes means suitable for sealing a receptacle immediately after the measuring cell has discharged liquid into a receptacle. Figure 5 illustrates in perspective a means that may suitably be employed for such sealing. In Figure 5 there is shown a turntable 19 which upon actuation, rotates clockwise. In the illustration, turntable 19 preferably includes a guide, as shown by 19', to insure proper positioning of the receptacles. Mounted on the turntable, in equally spaced holes such as shown by 46, is a plurality of receptacles, such as glass tubes 20, 50, 51, etc. preferably having flanged mouths whereby the top portion of each tube is substantially flush with the top surface of the turntable when the tube is mounted on the turntable. On the top surface of the turntable, and adjacent each of holes 46, the turntable is provided with an upright, such as shown by upright 42, which may be in the form of a "tee" adapted to hold a metal ball of a size sufficient to seal the mouth of a receptacle when the metal ball is seated therein in a manner shown by metal ball 43 seated on receptacle 50. Preferably, each tee is provided with a groove, as shown by groove 47 whereby a metal ball seated on the tee, upon being forced from the tee, will roll into the mouth of the receptacle adjacent thereto. Suitably mounted on a support, such as bar 41 is a bar 48 rigidly positioned in a manner shown, the end portion 48a of bar 48 being in the path of the metal balls (mounted on uprights 42) as the turntable rotates. In an arragement as shown in Figure 5, and with a tube 20 having received a measured amount of liquid discharge from capillary C, the turntable is rotated the distance required to replace filled receptacle 20 with empty receptacle 49 adjacent thereto for receipt of the next discharge from capillary C. With tees 42 loaded with metal balls, e. g., metal balls 44 and 45, of suitable size for sealing the receptacles, bar 48 collides with metal ball 44 shortly after the turntable starts to rotate but before the turntable rotation is stopped, and upon such collision, ball 44 rolls, via the groove in the tee holding metal ball 44, and seats itself in the mouth of receptacle 20. Similarly, upon subsequent rotation of the turntable after a subsequent discharge of liquid into adjacent receptacle 49 has been completed (receptacle 49 having been brought into registry with capillary C), bar 48 collides with metal ball 45 seated on a tee adjacent to receptacle 49, and a similar sealing is provided for receptacle 49 after that receptacle has received the distillate discharged from the capillary C.

It is apparent from the foregoing description of apparatus embodied herein that the use, in combination, of the means aforedescribed correlated in the manner set forth provides an apparatus that is automatic in manner and is adaptable for collection of a plurality of fractions from a liquid containing means in an advantageous highly efficient manner. Thus, as will be apparent to those skilled in the art, an important feature of the apparatus is that it is adaptable for precise collection of fractions of predetermined volume, and particularly a plurality of fractions of predetermined equal volume, with a minimization of time required for the segregation and collection of the desired fractions. For instance, by including means that may be arranged to be actuable after a substantial portion of, but before the total amount of liquid to be discharged by the measuring cell, has entered a receiving receptacle, the apparatus of this invention is operable in an efficient automatic manner irrespective of the variations in time that may be required by a measuring cell to discharge into a receptacle the same volume from different fractions of a liquid. Hence, the apparatus is adaptable for flexible operation to the extent of efficient operation until a substantial portion of the measured volume from the measuring cell has entered the receiving receptacle whereby only a short period of time need arbitrarily be fixed for the time delay to allow the measuring cell to complete drainage of the liquid therein following activation of the photocells, i. e.—a short period of time sufficient to allow drainage of an amount of liquid representing the difference between the total volume, including drainage, to be discharged by the measuring cell in one cycle and the amount of liquid that has already been discharged into the receptacle and which has actuated the photocells. As such, the apparatus embodied herein enables segregation and collection of a series of fractions in efficient, time-saving and precise manner, and represents a marked advance in the art over apparatus, though automatic in nature, wherein turntables are employed, but wherein rotation of the turntable is effected on a predetermined time schedule and turntable rotation is effected irrespective of the variance in time that may be required for the same volume from different fractions to discharge into receptacles therefor. For example, in apparatus wherein turntable rotation is effected on a fixed predetermined time schedule, the schedule is generally set at time intervals substantially in excess of the expected time for discharge of each particular fraction in order to insure that overlapping of fractions does not occur. Obviously, such practice is time-consuming to the extent that a considerable time loss occurs in collection of each fraction due to the considerable safety factor generally used to insure adequate time for drainage of different fractions which may individually vary as to the time required for drainage, and results in a cumulative increase in the overall time required for completion of collection of a plurality of fractions. Such objectionable features are overcome by an apparatus such as embodied herein which is not dependent on fixation for turntable rotation on a fixed predetermined time schedule and in which the tendency for undesired commingling of fractions to occur is minimized irrespective of the differences in time that may be required for discharge of measured amounts of liquids, as for example, the differences in time that may be required for discharge of a measured initial fraction as compared to the time required for discharge of the same volume for a succeeding higher boiling, and possibly, more viscous fraction.

In the fractionation of liquids, measurement of the vapor temperature in the still from which individual fractions are collected is often desired, and for such purposes, means for measurement of such temperatures are known to the art, a suitable example thereof being a thermocouple inserted in the head of the still and connected to a recording potentiometer. For such a purpose, the apparatus of this invention, desirably includes a temperature measuring and recording means for recording and measuring the temperature during each cycle, such measurement and recording being effected upon actuation of the Sensitrol S by the photocells. In illustration, a suitable thermocouple may be inserted in the head of still 10, the thermocouple being connected to a recording potentiometer. By incorporating in the potentiometer a suitable means, such as a solenoid-actuated member, which is connected to and actuable by relay 1, a recording of the temperature upon each actuation (through reset relay S) of relay 1 by the photocells is made, thus resulting in an accurate recording of temperature in the still head for each fraction collected during operation of the apparatus described herein.

Obviously, many modifications and variations of the invention, as hereinbefore set forth, may be made without departing from the spirit and scope thereof and therefore only such limitations should be imposed as are indicated in the appended claims.

We claim:

1. An apparatus, adaptable for automatic collection of a plurality of liquid fractions, comprising, in combination, a liquid-containing means, a measuring means adaptable for receipt of liquid from said liquid-containing means and to discharge upon receipt of a predetermined volume of liquid, a collecting means including a plurality of receptacles and actuable to position a first receptacle for receipt of liquid discharge from said measuring means and to replace said first receptacle with a second receptacle at said receiving position for receipt of a subsequent liquid discharge, a light source and a light responsive means, said light source and said light responsive means being positioned with respect to each other and with the receptacle in the receiving position whereby, upon introduction of liquid to a predetermined level in the receptacle, light from said light source is focused by the liquid in the receptacle and the focused light actuates the light responsive means and means including a time delay means actuable upon actuation of said light responsive means to actuate the collecting means for replacement of the first receptacle having received said liquid discharge with a second receptacle after time delay sufficient to allow said measuring means to complete its discharge.

2. An apparatus, adaptable for automatic collection of a plurality of liquid fractions, comprising, in combination, a liquid-containing means, control means adapted to control liquid discharge from said liquid-containing means, a measuring means adaptable for receipt of liquid from said liquid-containing means and to discharge upon receipt thereby of a predetermined volume of liquid, a collecting means including a plurality of light-transmittable receptacles and actuable to position a first receptacle for receipt of liquid discharge from said measuring means and to replace said first receptacle with a second receptacle at said receiving position for receipt of a subsequent liquid discharge, a light source and a light responsive means, said light source and said light responsive means being positioned with respect to each other and with the receptacle in the receiving position whereby, upon introduction of liquid to a predetermined level in the receptacle, light from said light source is focused by the liquid in the receptacle and the focused light actuates the light responsive means, and a time delay means actuable upon actuation of said light responsive means to prevent the control means for a predetermined period of time from discharging liquid into said measuring means and provide sufficient time delay to allow said measuring means to complete its discharge and, upon completion of said time delay, to actuate the collecting means for replacement of the first receptacle having received said liquid discharge with a second receptacle.

3. An apparatus, adaptable for automatic collection of a plurality of liquid fractions, comprising, in combination, a distillation column, control means adapted to control condensate discharge from said column a measuring means adaptable for receipt of condensate from said column, and to discharge upon receipt of a predetermined volume of condensate, a collecting means including a plurality of light-transmittable receptacles and actuable to position a first receptacle for receipt of condensate discharge from said measuring means and to replace said first receptacle with a second receptacle at said receiving position for receipt of a subsequent condensate discharge, a light source and a light responsive means, said light source and said light responsive means being arranged with respect to each other and with the receptacle in the receiving position whereby, upon introduction of condensate to a predetermined level in the receptacle, light from said light source is focused by the condensate in the receptacle and the focused light actuates the light responsive means, and a time delay means actuable upon actuation of said light responsive means to prevent said control means for a predetermined time period from discharging condensate into said measuring means and to allow sufficient time delay for said measuring means to complete its discharge and, upon completion of said time delay, to actuate the collecting means for replacement of the first receptacle having received said condensate discharge with a second receptacle.

4. An apparatus, as defined in claim 3, wherein the light responsive means is a photocell.

5. An apparatus, as defined in claim 3, wherein the light responsive means is a plurality of photocells electrically connected in a balanced circuit when substantially the same light intensity falls on each photocell, said circuit being unbalanced upon change of light intensity on one cell when the condensate in the receiving receptacle reaches a predetermined level.

6. An apparatus, as defined in claim 3, wherein the measuring means is a siphon pipette.

7. An apparatus, as defined in claim 3, wherein the collecting means is a turntable.

8. An apparatus, as defined in claim 3, wherein the collecting means is a turntable including a plurality of glass receptacles positioned at equally spaced intervals in a circumferential portion of said turntable.

9. An apparatus adapted for automatic collection of a plurality of liquid fractions comprising, in combination, a distillation column, control means adapted to control condensate discharge from said column, a siphon pipette adapted to receive condensate from said column and to discharge by siphon action upon introduction of a predetermined volume of condensate into said pipette, a turntable collecting means including a plurality of cylindrical light transmittable receptacles actuable to position a first receptacle for receipt of condensate discharge from said pipette and to replace said first receptacle with a second receptacle at said receiving position for receipt of a subsequent condensate discharge from said pipette, a diffused light source and a photocell, said light source and said photocell being so positioned with respect to each other and with the receptacle in the receiving position that, upon introduction of condensate to a predetermined level in said receptacle, diffused light from said light source in focused by lens action of the condensate in the receptacle and the focused light actuates the photocell, and time delay means actuable upon actuation of said photocell to prevent said control means for a predetermined time period from discharging condensate into the pipette and allow sufficient time delay for said pipette to complete its discharge and, upon completion of said time delay, to actuate the turntable for replacement of the receptacle having received a condensate discharge from the pipette with a second receptacle for receipt of a subsequent condensate discharge by the pipette.

10. An apparatus, adaptable for automatic collection of a plurality of liquid fractions comprising, in combination, a liquid-containing means, a measuring means adaptable for receipt of liquid from said liquid-containing means and to discharge upon receipt of a predetermined volume of liquid, a collecting means including a plurality of receptacles and actuable to position a first receptacle at a receiving position for receipt of liquid discharge from said measuring means and to replace said first receptacle at said receiving position for receipt of a subsequent liquid discharge, a light source and a light responsive means, said light source and said light responsive means being positioned with respect to each other and with the receptacle in the receiving position whereby, upon introduction of liquid to a predetermined level in the receptacle, the liquid in the receptacle alters the intensity of light falling on said light responsive means whereby said light responsive means is actuated, and means including a time delay means actuable upon actuation of said light responsive means to actuate the collecting means for replacement of the first receptacle having received said liquid discharge with a second receptacle after time delay sufficient to allow said measuring means to complete its discharge.

11. An apparatus, as defined in claim 10, wherein the light responsive means comprises a plurality of photocells electrically connected in a balanced circuit when substantially the same light intensity falls on each photocell, said circuit being unbalanced upon change of light intensity falling on one cell when the liquid in the receiving receptacle reaches a predetermined level.

JOHN W. PUTT.
JOHN O. SMITH, Jr.
JOHN O. McLEAN.

REFERENCES CITED

The following references are of record in the file of this patent:

UNITED STATES PATENTS

| Number | Name | Date |
|---|---|---|
| 1,922,188 | Zworykin | Aug. 15, 1933 |
| 2,114,867 | Wilson | Apr. 19, 1938 |
| 2,142,920 | Rose | Jan. 3, 1939 |
| 2,147,422 | Bendy | Feb. 14, 1939 |
| 2,383,377 | Evans et al. | Aug. 21, 1945 |
| 2,468,872 | Goldsbarry et al. | May 3, 1949 |

OTHER REFERENCES

"Automatic Laboratory Fractionating Column," by Smith et al., in Industrial and Engineering Chemistry, Anal. Ed., vol. 17, No. 1 beginning on page 47.

"Automatic Vacuum Take-off Arrangement for Fractional Distillation," by Brown et al., in Industrial and Engineering Chemistry, Anal. Ed., vol. 19, No. 11 beginning on page 935.

"Measurement and Control of Process Variables," Chemical and Metallurgical Engineering, May 1943, pages 114 and 115.

"Nature," February 18, 1950, pg. LXXXIX.